Aug. 18, 1936.  J. A. SPEED  2,051,351
FUEL FEED FOR INTERNAL COMBUSTION ENGINES
Filed Nov. 24, 1931  2 Sheets-Sheet 1

Inventor:
James A. Speed;
By R. S. Bury
Att'y.

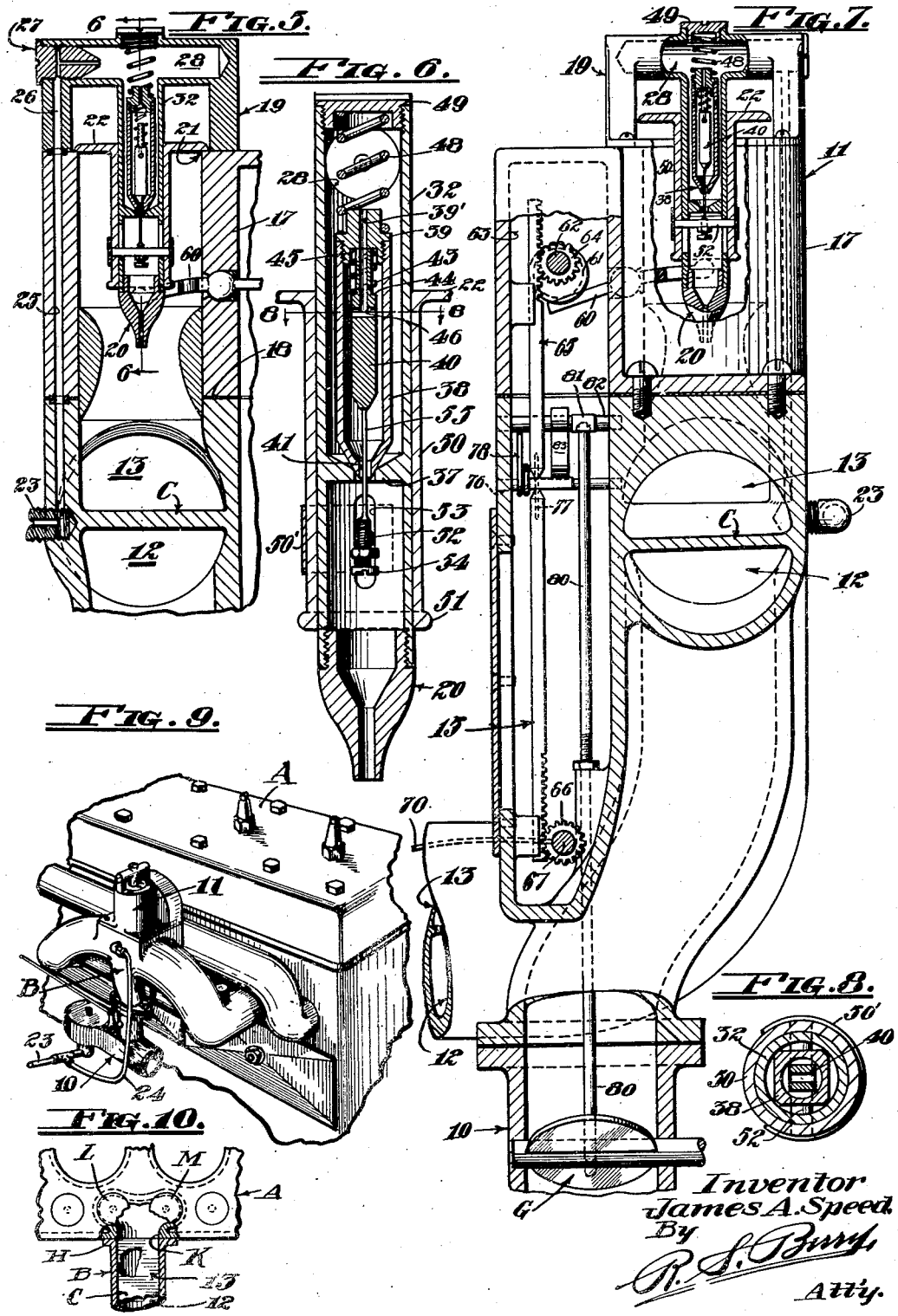

Patented Aug. 18, 1936

2,051,351

UNITED STATES PATENT OFFICE 2,051,351

FUEL FEED FOR INTERNAL COMBUSTION ENGINES

James A. Speed, Los Angeles, Calif., assignor of one-fourth to A. M. Eckard and one-fourth to H. C. McManus, Los Angeles, Calif.

Application November 24, 1931, Serial No. 577,018

6 Claims. (Cl. 123—127)

This invention relates to internal combustion engines and has particular reference to means for feeding combustible fuel thereto.

The present day internal combustion engine, especially in motor vehicles, is equipped with fuel feed means wherein each engine cylinder is supplied with fuel from a single manifold in communication with a source of supply of combustible fuel. In operating such engines at high speeds and also when a quick wide opening of the throttle is effected, the ratio of increase in volume of the fuel feed through the manifold to the increase in velocity of the flow of fuel to the engine is usually insufficient to properly meet the fuel demands of the engine and the latter therefore does not operate efficiently at all speeds and at all times. Since a high velocity of flow of fuel through the manifold is desirable at all times to insure effective turbulence and a more thorough carburetion of the air without such waste of fuel as often caused by adherence and eddying thereof along the walls of the manifold when fed at slow velocities, the manifold or fuel feed passages leading to the engine have necessarily been of small diameters. Owing to this universal practice, the unbalanced condition aforementioned is brought about, and if, in attempting to remedy this objection, a manifold of a diameter large enough to provide the proper volume of fuel to meet the varying demands of the engine is employed, then the velocity of the fuel stream will drop below the point necessary to secure the aforesaid high velocity advantages.

Furthermore, an ordinary carburetor or a single fuel supply device is usually insufficient to provide the proper volume of fuel to meet the varying fuel demands of the engine, since at high speeds the fuel demands of the engine often exceed the output of the carburetor or single source of fuel and therefore the engine fails to operate efficiently. This is especially true with the single feed manifold or passage of small diameter such as now generally used to supply each engine cylinder with fuel.

In view of the foregoing it is an object of this invention to eliminate said objections and provide for a more efficient and economical engine operation at all times. Accordingly I provide for each engine cylinder, multiple fuel feed manifolds, conduits or passages of such small diameter as to insure the desirable high velocity fuel feed therethrough and which have sufficient volumetric capacity to accommodate the volume of fuel necessary to meet the demands of the engine at all times.

To overcome the objections occasioned by the present day use of a single carburetor, and render more efficient the multiple passage arrangement, I preferably employ multiple sources of fuel in an arrangement whereby the additional sources are brought into and out of operation to fully meet the fuel demands of the engine, while maintaining the high velocity flow when the larger as well as smaller volumes of fuel are fed to the engine.

Another object of this invention is to provide fuel feed means of the character described which will operate automatically responsive to the varying fuel demands of the engine to bring into and out of operation the multiple fuel feed sources and passages.

A further object is to provide a fuel supply means of the character described which may comprise independent low speed and high speed fuel sources, such as carburetors, wherein the high speed carburetor is normally inoperative and is made operative and inoperative only when predetermined variations in the fuel demands of the engine take place.

Another object is to provide in accordance with this invention a simply constructed and comparatively inexpensive fuel feed unit which is comprised of an intake manifold and an auxiliary high speed carburetor, and is subject to ready installation between the ordinary or low speed carburetor and the engine of various makes of motor vehicles as a replacement part for the ordinary intake manifold.

A further object is to provide a carburetor unit of the character described in which the intake manifold has dual feed passages communicating with each engine cylinder, in an arrangement making possible an efficient combination therewith of an auxiliary or high speed carburetor as well as facilitating a reliable control of the opration of said carburetor while providing for the usual feed of fuel from the low speed carburetor.

Yet another object of this invention is to provide a fuel feed means of the character described wherein the control and regulation of the fuel feed thereof may be effected by the velocity of the fuel stream passing through the manifold.

Another and important provision of the invention is that automatically rendering the high speed carburetor inoperative upon closing the throttle valve whereby to prevent the force of the gases passing from the high speed carburetor through the manifold from maintaining such carburetor in operation after the throttle valve for the primary carburetor is closed.

With the foregoing objects in view, together with such other objects and advantages as may subsequently appear, the invention resides in the parts and in the combination, construction and arrangement of parts hereinafter described and claimed and illustrated by way of example in the accompanying drawings, in which:

Figure 5 is an enlarged sectional view taken on line 5—5 of Figure 1;

Figure 6 is an enlarged sectional view taken on line 6—6 of Figure 5;

Figure 7 is an enlarged sectional view taken on line 7—7 of Figure 2;

Figure 8 is a cross section taken on line 8—8 of Figure 6;

Figure 9 is a fragmentary perspective view of an internal combustion engine equipped with the carburetor means of this invention;

Figure 10 is a fragmentary plan view of the engine showing manner of connecting the multiple feed passages to feed fuel to each cylinder.

In carrying out one embodiment of this invention, multiple feed passages are arranged to serve each engine cylinder, and independent sources of fuel, such as carburetors, are employed, one source being the primary or low speed carburetor and the other the auxiliary or high speed carburetor. The high speed carburetor is designed to be inoperative while the low speed carburetor is functioning to feed fuel when the engine is operated at slow speeds, but becomes operative when the speed or conditions of operation of the engine are such that the slow speed carburetor is incapable of supplying sufficient fuel to effectively meet the demands of the engine. Preferably, this invention contemplates the use of the ordinary carburetor such as forms a part of the regular equipment of the present day motor vehicle, as the slow speed carburetor, and therefore this invention may be easily carried out by the mere addition to said regular equipment of the auxiliary carburetor and its associated mechanism.

One convenient and efficacious way to carry out the invention is to combine the auxiliary high speed carburetor with an intake manifold having multiple passages or conduits connected with each engine cylinder whereby to provide a carburetor-manifold unit which may be readily substituted for the ordinary manifold. In this arrangement the auxiliary carburetor is connected with one manifold passage and is normally inoperative whereas the low speed or regular carburetor is connected with another manifold passage and is operative at all times. To render the high speed carburetor operative at the proper time whereby to augment the fuel supply to the engine, I prefer to employ a control means which is contained in said manifold and operated by the force of the gases passing through said manifold.

Figure 1:
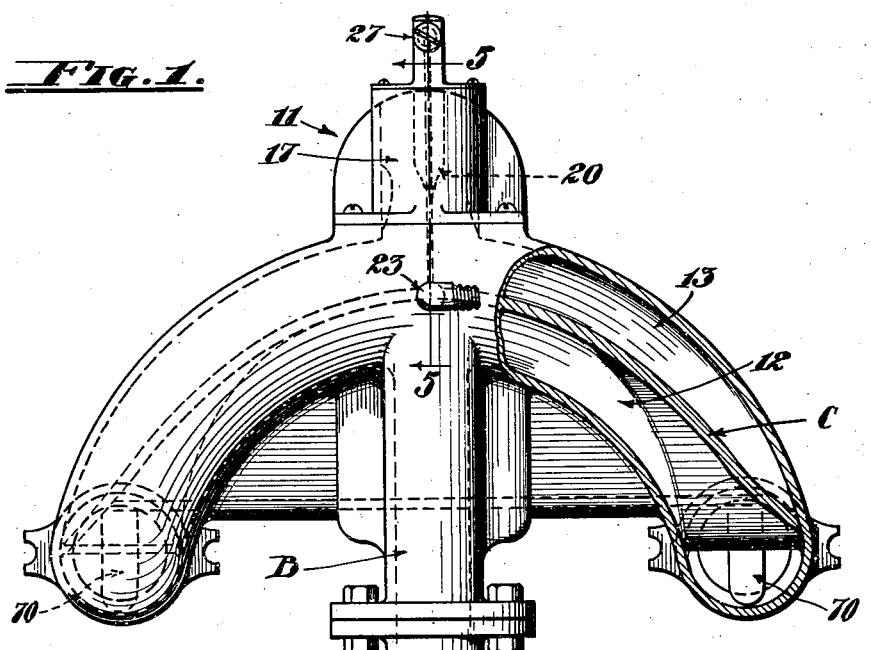
Figure 1 is a front elevation of the carburetor intake manifold unit of this invention, with parts broken away for the sake of clarity of illustration.

Referring more in detail to the embodiment of the invention shown in the accompanying drawings, particularly Figures 1, 7 and 9, the carburetor unit is seen to generally comprise a carburetor 10, such as forms a part of the regular equipment of an internal combustion engine A of an automobile, not shown, an auxiliary or high speed carburetor 11, intake conduits or passages 12 and 13 leading respectively from carburetors 10 and 11 to said engine, and a means 15 for controlling the operation of the carburetor 11.

The auxiliary or high speed carburetor 11 is normally inoperative but is arranged to feed fuel into the passage 13 when the speed of the engine advances to a predetermined point, or when the throttle valve is suddenly opened. I am aware that various means operated either manually or automatically in response to engine speed variations may be employed to control the auxiliary carburetor, but I prefer to employ the means 15 which is operated by the velocity of the fuel gases flowing through the conduits 12 and 13 from the carburetor 10 to the engine.

With such an arrangement the means 15 will render the carburetor 11 operative and inoperative dependent on the engine speed, and aforesaid throttle manipulation, to increase and decrease the fuel feed to meet the fuel demands of the engine. Thus it is seen that the carburetor 10 becomes the slow speed carburetor operating independent of the auxiliary carburetor under slow engine speeds, for example when the automobile is traveling under 25 miles per hour, whereas the high speed carburetor 11 commences its operation and augments the fuel feed when higher engine speeds, say of about 25 miles per hour, are reached. However, it should be noted that even when traveling at slow speeds should the throttle be suddenly opened, the auxiliary carburetor will be rendered operative as will be hereinafter described.

Preferably the conduits 12 and 13 are provided in a single manifold B having a partition C which defines the separate conduits. This arrangement provides for two fuel passages to each engine cylinder and facilitates the combination of the auxiliary carburetor with the manifold in such manner that the carburetor is virtually a part of the manifold. It is therefore only necessary to substitute the manifold-carburetor unit for the regular manifold in order to carry out my invention in various makes of motor vehicles.

In order to provide the auxiliary carburetor 11 as a part of the manifold B the upper central part of the latter has secured thereto a shell like body portion 17 the lower end 18 of which opens in the uppermost manifold passage 13. A header 19 is fixed on the upper end of this body portion and supports a valved jet or nozzle 20 which extends into said body through the air intake opening 21 at the upper end of the latter as shown in Fig. 5. Associated with the valved jet 20 is a valve 22 arranged to control the air intake opening 21. The arrangement is such that the jet 20 and valve 22 are coincidentally opened and closed although they are normally closed and thereby normally render inoperative the carburetor provided thereby.

Fuel is conducted to the jet from the main feed line 23 through a branch feed line 24 shown in Fig. 9, also through passages 25 and 26 formed in the body portion and header, and an adjustable jet or nozzle 27 shown in Fig. 5. The jet 27 is screwed into one end of a T-shaped tubular portion 28 of the header and is adjustable exteriorly of the carburetor.

Fuel discharging from the jet 27 enters the head of the T-shaped portion 28 and gravitates therefrom into the stem 32 of said portion. Passage of the fuel through the stem 32 and out of a jet or nozzle portion 33 into a mixing chamber E is controlled by valve means next described, said valve means being here shown as operated by the means 15 which is actuated by the velocity of the gases passing from the primary carburetor 10.

The aforesaid valve means includes, as best shown in Figure 6, a centrally apertured partition 36 in the stem 32, in the aperture 37 of which partition is a vertically movable tubular valve member 38 arranged to control the passage of fuel through said aperture.

The upper end of the tubular valve member 38 is closed by a plug 39 having a passage 39' therethrough whereby fuel standing in the stem when the valve member 38 is closed, is permitted to enter the interior of said valve member. A secondary valve member 40 located interiorly of the valve member 38 controls the passage of fuel through an outlet 41 formed in the lower end of the member 38. It is noted that when the valve 38 is closed, see Figure 6, the outlet 41 is in a position to discharge fuel through the aperture 37 into the mixing chamber. However, such discharge of fuel is normally prevented by valve 40 which is held seated, as shown in Figure 5, by a spring 43 mounted on the reduced upper end of said valve. The spring 43 at one end engages a shoulder 44 on the valve 40 and at its upper end engages in a recess 45 in the inner end of the plug 39. It should be noted that a T-shaped passage 46 is formed in the upper part of the valve 40 whereby, as shown in Figure 6, an unobstructed flow of fuel is provided for when said valve is in its uppermost position and engaged with the plug 39.

Provision for normally closing the valve member 38 is made by use of a spring 48 which telescopes the upper end of the plug 39 and at its upper end engages with a plug cap 49 screwed into the portion 28. This plug cap provides for regulating the tension of the spring 48 and also facilitates access to the interior of the portion 28 for purposes of assembling and disassembling the valves therein.

The air intake valve 22 includes a sleeve 50 slidably telescoping the stem 32 and provided at its lower end with a flange 51. A pin 52 is extended transversely through and has its ends held in the sleeve 50 by a spring clip 50', there being slots 53 in the stem 32 to slidably accommodate the pin. Carried by said pin within the stem 32 is a vertically adjustable screw 54. Extending upward from this screw is a rod 55 which passes upward through the aperture 37 and the outlet 41 into the valve 38 where it engages the lower end of the secondary valve 40.

It will now be seen that when the sleeve 50 is raised so as to open the air intake valve 22, the pin 52, screw 54 and rod 55 are likewise raised and cause the valve 40 to lift and open the outlet 41, as shown in Fig. 6. Inasmuch as the spring 48 is stronger than the spring 43 the valve 40 will open before the valve 38, which latter is not caused to open until the pressure of the rod 55 overcomes the force of the spring 48. As the valves and their seats are conical, it should be noted that the amounts of air and fuel admitted by the valves are varied dependent on the extent of opening of the latter, and that the lesser flow of fuel is controlled by the valve 40 which is of necessity fully opened before the greater flow permitted by the larger valve 38 is effected.

This fuel feed regulation is essential inasmuch as at certain speeds the valve 40, when opened, will provide for sufficient fuel to meet the demands of an efficiently operated engine whereas at greater engine speeds both valves will be opened to provide the necessarily greater amount of fuel.

Figure 3:
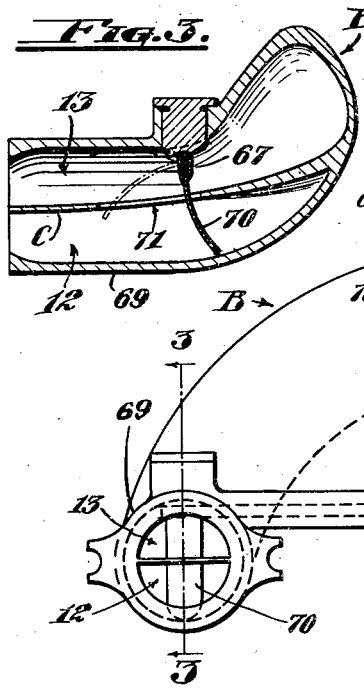
Figure 3 is a sectional view taken on line 3—3 of Figure 2.
Figure 2:
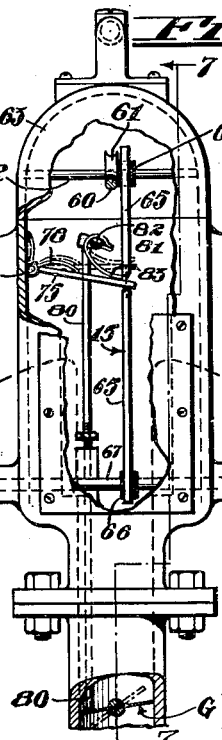
Figure 2 is a rear elevation of the unit, as shown in Figure 1, with parts broken away.
Figure 4:
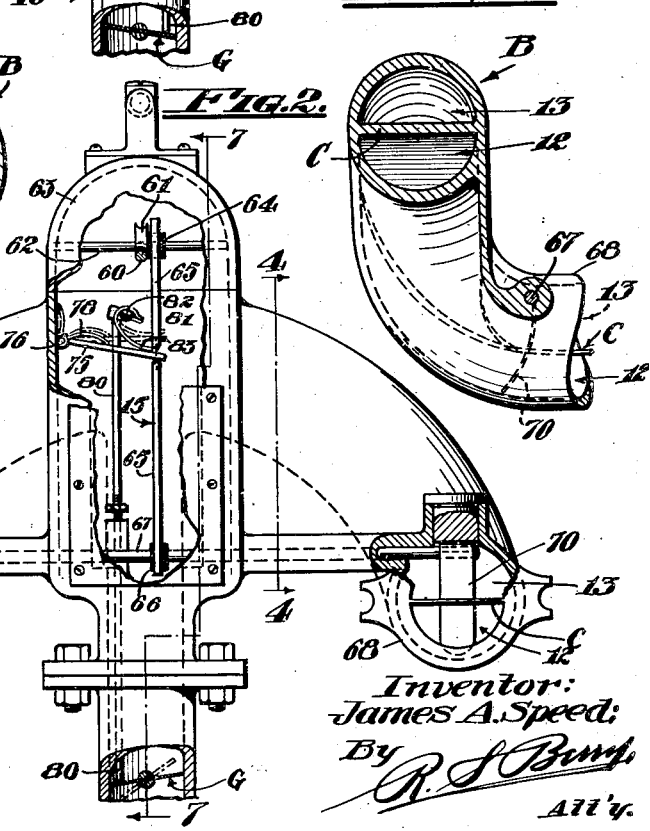
Figure 4 is a sectional view taken on line 4—4 of Figure 2.

Means operating responsive to variations in the speed of the engine is provided for operating the valves of the auxiliary carburetor 11. As here shown (see Fig. 7) said means includes a pivoted yoke 60 operated by a cam 61 and disposed to engage the lower end of the sleeve 50. A shaft 62 journalled in a housing 63 on one side of the body portion 17, carries said cam and is operated by a pinion 64. The pinion 64 meshes with a rack bar 65 which at its lower end meshes with a pinion 66 on a shaft 67 extending transversely across the lower end of the housing 63. The ends of the shaft 67 are disposed within the branches 68 and 69 of the manifold, particularly within the upper passage 13, as shown in Fig. 2. Impeller vanes or blades 70 are fixed to said ends of shaft 67 and depend like crank arms therefrom, with their flat sides at right angles to the direction of the flow of gases through the manifold. A slot 71 (see Fig. 3) in the partition C of the manifold permits of swinging movement of the vanes 70. The dimensions of the vanes are such that they will not objectionably obstruct the flow of gases through the manifold and yet admit of the vanes being swung or moved by said gases when the velocity thereof reaches a predetermined point. For example, when the automobile is traveling under 25 miles per hour, the velocity of the gases or fuel passing through the manifold is insufficient to appreciably move or swing the vanes, but on increasing the speed beyond 25 miles per hour, the velocity of flow of the fuel through the manifold is accordingly increased and thereby swings the vanes whereby to rotate the shaft 67, raise the rack 65 and bring the auxiliary carburetor 11 into operation. However, the auxiliary carburetor 11 may be placed in operation when the engine is operating at lower speed than that required to effect such velocity of flow of the fuel through the manifold as to swing the vanes 70. This occurs on sudden opening of the throttle valve when the engine is operating at a low speed by reason of such opening of the throttle valve momentarily creating differential pressures on opposite sides of the vanes 70 by breaking or partially breaking the negative pressure existing between the throttle valve and the vanes whereupon the partial vacuum or negative pressure in the manifold on the opposite sides of the vanes will act to swing the vanes so as to bring the auxiliary carburetor into operation and to maintain it in operation until the pressures on opposite sides of the vanes become equalized or the engine is accelerated to create sufficient velocity of flow of the gases through the manifold to retain the vanes in their advanced position. It should be noted that a greater movement or swing of the vanes and a correspondingly greater opening of the valves 38 and 40 whereby to increase the fuel feed from the carburetor 11, accompany an increase in velocity of the flow of fuel which latter results from increasing the engine speed or from suddenly opening the throttle valve.

To normally hold the rack, pinions, vanes, etc. in inoperative position, an arm 75 is pivoted at one end, as at 76, to a wall of the housing 63 and has its other end connected with the rack bar 65, it being noted that the latter is in sections joined by a pin 77 which also connects the arm 75 with said rack bar. A spring 76 is arranged to force the arm downward and the downward pressure is thus exerted on the rack whereby to hold the operating parts in normal or inoperative position. However, the vanes swing against the action of the spring when the velocity of the gases reach the predetermined points as aforementioned, the spring merely being of sufficient strength to insure the normal holding of the vanes in perpendicular position in the manifold. The force of the spring is therefore taken into consideration in determining the velocity necessary to move or swing the vanes as aforesaid.

Means is provided to positively control the operation of the auxiliary carburetor 11 through manipulation of the throttle valve G. This is necessary since when the engine is operated at a speed which causes the auxiliary carburetor 11 to operate, and the operator closes the throttle, the velocity of flow of fuel from the carburetor 11 through passage 13 might prove sufficient to maintain the vanes in raised position, as indicated by the dotted lines in Figure 3, and thereby maintain the carburetor 11 in operation, with the result that the closing of the throttle G would not decelerate the engine. Consequently, I provide an arrangement whereby on closing of the throttle G the carburetor 11 is automatically rendered inoperative.

Accordingly a push rod 80 is arranged in the manifold so that its lower end is in position to be engaged and raised by the throttle valve G when the latter is closed. The upper end of this push rod is connected with a crank arm 81 on a shaft 82 arranged transversely of the housing 83. The shaft 82 will therefore be rotated when the throttle valve is closed and through a leaf spring 83 affixed thereto and engaging the arm 75, will yieldingly urge the arm downward whereby to move the rack downward. On this downward movement of the rack bar 65, the pinion 64 turns the shaft 63 so that the cam 61 permits the yoke 60 to rock downward under influence of the spring 48, and the valves 22, 38 and 40 will then close and thereby render the carburetor 11 inoperative.

It should be noted that although in the present embodiment of the invention, the multiple passage intake manifold B has each of its outlet ends H connected with an engine intake port K which latter serves the two valves L and M for two engine cylinders, as shown in Figure 10, the arrangement is construed as providing a plurality of fuel feed passages for each engine cylinder, or valve, inasmuch as the valves do not operate at the same time. Therefore it is seen that for example, when valve L is opened the multiple fuel feed passages serve said valve alone and when valve L is closed and valve M is opened the latter is served by the multiple feed passages.

In view of the foregoing, I wish it to be understood that I consider any arrangement whereby fuel is fed up to the engine port such as the port K here shown, or directly up to the valves or valve parts or seats of each cylinder, through a plurality of fuel feed passages of the character hereinbefore described and leading from a source of supply of fuel to constitute a means for feeding of fuel directly to each cylinder through a plurality of independent feed passages and to be within the scope of my invention.

It is important to note that the use, in accordance with this invention, of a plurality of fuel ducts or passages of comparatively small diameter for servicing each cylinder of the engine makes possible the introduction to said cylinder of a greater volume of fuel than is possible with the single conduit such as now generally used, without an appreciable or objectionable decrease in the velocity of the flow of said fuel through said passages. Therefore, it is apparent that the plurality of small diameter passages provide for the proper ratio of volume increase to the velocity increase or vice versa to insure the feeding to the engine at all times of the proper amount of fuel to effect a most efficient engine operation at all speeds and loads. Although this provision is best insured by the use, as hereinbefore noted, of the two carburetors arranged to operate independently and simultaneously as the fuel demands of the engine are varied, it should be borne in mind that the invention may be carried out to a great measure of advantage where the multi-passage manifold is served by a single source of fuel supply, or single carburetor.

I claim:

1. A manifold having a plurality of passages for conducting fuel directly to each cylinder of an internal combustion engine, and an auxiliary carburetor operative to supply fuel to one passage of said manifold only when the engine reaches a predetermined speed.

2. A manifold having independent passages therein for conducting fuel from a source of fuel supply to an internal combustion engine, and an auxiliary carburetor carried by said manifold and connected with one of said passages and operating to supply fuel thereto only when the engine reaches a predetermined speed.

3. A plurality of independent fuel intake conduits for each cylinder of an internal combustion engine, a normally inoperative carburetor connected with one of said conduits, and means rendering said carburetor operative only when a predetermined engine speed is attained in the engine with which said conduits are connected.

4. In a fuel feed means for an internal combustion engine, a fuel intake manifold having a plurality of independent passages for connection with each cylinder of the engine, a normally inoperative auxiliary source of fuel supply arranged to feed fuel through one of said passages to each cylinder of the engine, and means operating responsive to variations in the velocity of flow of fuel through said manifold, to render operative and inoperative said normally inoperative fuel source, a throttle valve associated with and controlling said manifold, and means operated through closing said valve to render said auxiliary fuel source inoperative.

5. In a fuel supply means for an internal combustion engine, an intake manifold having a plurality of independent passages adapted for direct communication with each cylinder of the engine and for connection with a source of supply of combustible fuel, said manifold having an auxiliary air intake opening in one of said passages, a valve normally closing said opening, a normally closed auxiliary fuel intake valve in said last named passage, means operating responsive to variations in the velocity of flow of fuel through said manifold for opening and closing said valves.

6. In combination, an internal combustion engine, a normally operative carburetor, a normally inoperative carburetor, independent conduits leading from said carburetors communicating with each of the cylinders of said engine, a vane in the conduit leading from said normally operative carburetor responsive to increase in the velocity of fuel flowing through said conduit, and means associated with said vane rendering operative said second named carburetor on said vane being moved under the influence of increased velocity of the fuel.

JAMES A. SPEED.